United States Patent [19]

Akiya et al.

[11] Patent Number: 4,887,097

[45] Date of Patent: Dec. 12, 1989

[54] RECORDING MEDIUM AND INK-JET RECORDING PROCESS EMPLOYING THE SAME

[75] Inventors: Takashi Akiya, Yokohama; Kenji Hasegawa, Isehara, both of Japan

[73] Assignee: Canon Kabushiki Kaisha, Tokyo, Japan

[21] Appl. No.: 133,783

[22] Filed: Dec. 16, 1987

[30] Foreign Application Priority Data

Dec. 17, 1986 [JP] Japan ................................ 61-298625

[51] Int. Cl.$^4$ ................................ G01D 9/00

[52] U.S. Cl. ................................ 346/135.1; 427/341

[58] Field of Search ................................ 346/135.1; 428/341, 428/342

[56] References Cited

U.S. PATENT DOCUMENTS

| | | | |
|---|---|---|---|
| 4,446,174 | 5/1984 | Maekawa et al. . | |
| 4,474,850 | 10/1984 | Burwasser . | |
| 4,517,244 | 5/1985 | Kobayashi et al. | 428/342 |
| 4,550,053 | 11/1985 | Arai et al. . | |
| 4,554,181 | 11/1985 | Cousin | 346/135.1 |
| 4,650,714 | 3/1987 | Kojima et al. | 428/341 |
| 4,701,837 | 10/1987 | Sakaki | 346/135.1 |
| 4,711,830 | 12/1987 | Haruta | 430/52 |

FOREIGN PATENT DOCUMENTS

| | | |
|---|---|---|
| 0125113 | 11/1984 | European Pat. Off. . |
| 0191645 | 8/1986 | European Pat. Off. . |
| 2543061 | 9/1984 | France . |
| 2580232 | 10/1986 | France . |
| 50-036280 | 11/1975 | Japan . |
| 37017 | 10/1976 | Japan . |
| 42744 | 11/1980 | Japan . |
| 57-173194 | 10/1982 | Japan . |
| 58-024492 | 2/1983 | Japan . |
| 61-188181 | 2/1985 | Japan . |
| 60-046290 | 3/1985 | Japan . |
| 61-074879 | 4/1986 | Japan . |
| 2175516A | 12/1986 | United Kingdom . |

OTHER PUBLICATIONS

Patent Abstracts of Japan, vol. 9, No. 38, Feb. 19, 1985, abstracting Japanese Patent No. 59-178291 (10/9/84).

Patent Abstracts of Japan, vol. 9, No. 87, Apr. 17, 1985, abstracting Japanese Patent No. 59-215890 (12/15/84).

*Primary Examiner*—H. Broome
*Assistant Examiner*—Huan H. Tran
*Attorney, Agent, or Firm*—Fitzpatrick, Cella, Harper & Scinto

[57] ABSTRACT

A recording medium having a substrate and an ink-receiving layer provided on said substrate, wherein said ink-receiving layer contains, in combination, solvent-soluble resin (A) that is capable of absorbing water in an amount of 0.5 times or more as much as its own weight and is substantially water-insoluble, and particles of solvent-insoluble resin (B) that is capable of absorbing water in an amount of 50 times or more as much as its own weight.

36 Claims, No Drawings

RECORDING MEDIUM AND INK-JET RECORDING PROCESS EMPLOYING THE SAME

BACKGROUND OF THE INVENTION

1. Field of the Invention

The present invention relates to a recording medium suitable for use in an ink-jet recording process, and a recording process employing the same. More particularly, it is concerned with a recording medium excellent in the ink receptivity, non-beading property, sharpness of recorded images and water resistance, and with an ink-jet recording process employing the same.

2. Related Background Art

In ink jet recording processes, the recording is carried out by forming ink droplets according to various ink (or recording liquid) ejection methods, for example, an electrostatic attraction method, a method in which mechanical vibration or displacement is applied to ink by use of a piezoelectric element, a method in which the pressure generated by heating ink and forcing it to foamis utilized, and so forth; and flying the droplets so that a part or the whole of them is adhered on a recording medium such as paper. These have been noted as recording processes that can be substantially free from noise and can perform high-speed printing and multicolor printing.

As the ink for ink-jet recording, those chiefly comprised of water are used in view of safety and recording performance, and polyhydric alcohols are often added thereto to prevent nozzles from being clogged and to improve the ejection stability.

As recording mediums used in the ink-jet recording process, therre have been hitherto used those comprising a porous ink-receiving layer provided on ordinary paper or on a substrate called ink-jet recording paper. However, with improved performances (such as increasing high-speed or multi-color recording) and widespread use of ink-jet recording devices, properties of a higher grade and wider range have been increasingly required also with respect to the recording mediums.

Namely, it is necessary for a recording medium used in ink-jet recording to obtain recorded images having a high resolution and high quality, to satisfy fundamental requirements that;

(1) ink is received by the recording medium as quickly as possible;

(2) even when ink dots have been overlapped, the ink adhered later may not flow into the dots adhered earlier;

(3) ink droplets may not diffuse over the recording medium to excessively enlarge the size of ink dots;

(4) the shape of an ink dot is substantially round with smooth peripheries;

(5) the ink dots have a high OD (optical density), and are free from unclearness around the dots; etc.

In addition to the performances required as above, the following performances are further required when recorded images having a high resolution comparable top color photographs are to be obtained by a multicolor ink-jet recording process:

(6) Coloring components of ink have a good color-forming property;

(7) the recording medium has a particularly good ink fixation since the same number of droplets as the number of the colors of ink may sometimes adhere overlappingly at the same portion;

(8) the surface is glossy;

(9) it has a high whiteness; etc.

The recorded images formed by the ink-jet recording process have been hitherto used solely for the surface image observation, but, with improved performance and widespread use of ink-jet recording devices, recording mediums suitable for use other than the surface image observation are being sought after.

The use other than the surface image observation may include a use in which images formed by projecting recorded images on a screen or the like by means of optical equipments such as a slide and an OHP (over head projector) are observed, a use as a color separation plate used when producing a positive plate for color printing, a use as a CMF (color mosaic filter) used for color display by liquid crystals, etc.

While diffused light of recorded images is principally observed when a recording medium is used for the surface image observation, what becomes a problem in the recording medium for the above uses is the transmitted light of the recorded images. Thus, in addition to the performances required as above in the recording medium for the ordinary ink-jet recording, the recording medium is further required to be excellent and in the light transmission properties, in particular, linear transmittance.

However, in the present state of the art, no recording medium that has satisfied all of these required performances has been available.

Moreover, many of the conventional recording mediums for the surface image observation have been employed in a system in which a porous ink-receiving layer is provided on its surface and ink is received in porous voids in the layer to fix a recording agent. Accordingly, because of the porousness, there has been no gloss on the surface of the recording mediums.

On the other hand, when the ink-receiving layer has a non-porous surface, there have been the disadvantages that non-volatile components in the ink, such as polyhydric alcohols, may remain unremoved from the surface of the recording medium for a long time after recording to prolong the time required for the ink to be dried and fixed, whereby clothes may be soiled when touched to the recorded images or the recorded images may be damaged.

There have been also the disadvantages that when the ink droplets are adhered on the ink-receiving layer, the ink droplets may irregularly migrate to cause image density unevenness called "beading", and the ink may be mutually mixed at the boundary portions at which ink droplets of different colors are adhered, resulting in irregularities of images and no sharp image obtained. Particularly when high density and high speed printing is carried out, the ink may increase in quantity to make these disadvantages more remarkable.

In the instance of the recording medium in which a water-soluble polymer is used for the formation of the ink-receiving layer in order to enhance the affinity for ink and the ink receptivity, there also can be the problem that the surface of this ink-receiving layer may become viscous under the condition of a high humidity, so that it may adhere to a lead-on roll of a printer when set in the printer, and that the recording medium can not be carried or the recording medium may suffer blocking when laid overlappingly.

SUMMARY OF THE INVENTION

Accordingly, an object of the present invention is to provide a recording medium that has a superior ink receptivity and water resistance of recorded images, and can obtain sharp images free from the beading or the color-mixing of adjacent dots even when high density and high speed recording is carried out, and a recording process employing the same.

Another object of the present invention is to provide a recording medium for full color ink-jet recording, that has a superior surface gloss and may not cause any surface stickiness, blocking or the like even under the condition of a high humidity.

Still another object of the present invention is to provide a recording medium for ink-jet recording, which can be used for observation of images by projecting recorded images on a screen or the like by means of optical equipments such as a slide, an OHP, etc.; or for observation of transmitted light by a color separation plate used when producing a positive plate for color printing, a CMF used for color display by liquid crystals, etc.

The above objects and other objects of the present invention can be achieved by the invention described below.

According to the present invention, there is provided a recording medium comprising a substrate and an ink-receiving layer provided on said substrate, wherein said ink-receiving layer contains in combination, solvent-soluble resin (A) that is capable of absorbing water in an amount of 0.5 times or more as much as its own weight and is substantially water-insoluble, and particles of solvent-insoluble resin (B) that is capable of absorbing water in an amount of 50 times or more as much as its own weight.

In another embodiment of the invention, there is provided a light-transmissive recording medium comprising a light-transmissive substrate and an ink-receiving layer provided on said substrate, wherein said ink-receiving layer contains in combination, solvent-soluble resin (A) that is capable of absorbing water in an amount of 0.5 times or more as much as its own weight and is substantially water-insoluble, and particles of solvent-insoluble resin (B) that is capable of absorbing water in an amount of 50 times or more as much as its own weight.

The present invention also provides an ink-jet recording process comprising impinging droplets of a recording solution containing a water-soluble dye on a recording medium, wherein said ink-receiving layer contains in combination, solvent-soluble resin (A) that is capable of absorbing water in an amount of 0.5 time or more as much as its own weight and is substantially water-insoluble, and particles of solvent-insoluble resin (B) that is capable of absorbing water in an amount of 50 times or more as much as its own weight.

DETAILED DESCRIPTION OF THE PREFERRED EMBODIMENTS

The recording mediumof the present invention generally comprises a substrate as a support, and a recording face, i.e., an ink-receiving layer, provided on the surface of the substrate. Particularly preferred embodiments thereof may include, for example;

(1) an embodiment wherein both of the substrate and the ink-receiving layer are light transmissive and the recording medium is light transmissive as a whole;

(2) an embodiment wherein the surface of the ink-receiving layer is smooth and glossy; etc.

In another embodiment, the ink-receiving layer in eachof the above embodiments may simultaneously serve as a substrate.

The present invention will be described further in detail by referring to the above several preferred embodiments as typical examples.

The solvent-soluble resin (hereinafter "resin A") principally characterizing the present invention, that is capable of absorbing water in an amount of 0.5 times or more, preferably 100 times or more, as much as its own weight and is substantially water-insoluble, may include;

(1) a polymer complex comprising a basic polymer and an acidic polymer;

(2) a resin containing a repeating unit wherein a side chain having a hydroxyl group has a molecular weight of 74 or more;

(3) an ethylene oxide polymer having an average molecular weight of 100,000 or more, or a copolymer mainly comprised of ethylene oxide, or a modified product of these; etc.

More specifically, referring to the polymer complex comprising a basic polymer and an acidic polymer, it comprises a basic polymer and an acidic polymer as described in Japanese Unexamined Patent Publication No. 188181/1986, wherein the basic polymer preferably includes homopolymers or copolymers of N-vinylpyrrolidone, N-vinylpiperidone, N-vinylcaprolactam, N-vinylmorpholine, N-vinyl-2-oxazolidone, N-vinyl-5-methyl-2-oxazolidone, etc. In the instance of the copolymers, they preferably include those containing 50 mol % or more of the nitrogen-containing monomer as mentioned above.

The acidic polymer capable of forming the polymer complex with the above basic polymer (in the present invention, the terms "acidic polymer" include polymers having a sulfonic acid group, a carboxylic acid group, a sulfate group, a phosphate group and a phenolic hydroxyl group in the molecules, as well as polymers having an alcoholic hydroxyl group) preferably includes homopolymers of $\alpha,\beta$-unsaturated acids, random copolymers and block copolymers, and particularly preferably includes copolymers of alkyl vinyl ethers with maleic anhydride.

The present inventors have hitherto made various studies about the mixtures of basic polymers with acidic polymers as mentioned above. As a result, they found that mixing these polymers in a solution results in some interaction between the both polymers to form a polymer complex different from any polymers; mixing the both polymers in a relatively poor solvent, a polymer complex can be precipitated; or mixing them in a relatively good solvent, there can be caused remarkable increase in the viscosity to give a polymer complex having properties different from those of a mere mixture of the both polymers used.

Accordingly, the polymer complex used in the present invention refers to the polymer complex comprising the polymers as mentioned above (details of the basic polymer, the acidic polymer and the polymer complex comprising these polymers are described in Japanese Patent Publications No. 37017/1976 and No. 42744/1980).

The present inventors have further made various studies about the use of these polymer complexes. As a result, they found that in spite of the remarkably hydrophilic nature of these polymer complexes, they are water-resistant or moisture-proof, and that when they are used in combination with resin (B) to form the ink-receiving layer of the recording medium for ink-jet recording, they can show better ink receptivity than the conventional water-soluble polymer, giving a sharp image, and moreover the surface thereof does not become sticky even under the condition of a high humidity.

In general, the polymer complex as mentioned above does not dissolve in the relatively poor solvent such as water, alcohols, esters and hydrocarbons. Accordingly, the polymer complex used in the present invention can be isolated by previously and separately dissolving the both polymers in any of these poor solvents and then mixing both of the solutions. A solution of the polymer complex can be also obtained by mixing them in a relatively good solvent such as dimethylformamide, dimethylacetamide and dimethylsulfoxide.

The basic polymer and acidic polymer preferably used for the formation of the polymer complex as mentioned above include those respectively having a molecular weight of 500 or more, preferably 1,000 or more, and an ink-receiving layer which has a great strength and is excellent in the ink receptivity, the sharpness of images and water resistance can be formed by using the both polymers having such molecular weight.

The both polymers to be used may be used in the proportion of basic polymer/acidic polymer ranging between 20/1 and 1/10 in weight ratio, preferably in the proportion such that the basicity and acidity of each polymer may become substantially equal. If used in the range outside the above weight ratio, the bond between both polymers may become insufficient, resulting in insufficient achievement of the objects of the present invention. More specifically, an overly large amount of the basic polymer may result in lowering of the water resistance, and an overly large amount of the acidic polymer may result in lowering of the ink receptivity.

The resin containing a repeating unit wherein a side chain having a hydroxyl group has a molecular weight of 74 or more will be described below.

Such a polymer can be obtained by homopolymerization of monomers having the hydroxyl-group-containing side chain of a molecular weight of 74 or more or by copolymerization of these monomers with other monomers. It can be further obtained by a process in which the modification is effected by allowing a polymer having a functional group such as a hydroxyl group, a carboxyl group, an amino group, an amide group, an epoxy group and an isocyanate group to react with a compound having a group capable of reacting with any of these functional groups and having a hydroxyl group, or also by hydrolysis of a polymer having a group such as an ester group capable of forming a hydroxyl group.

As typical examples, here will be described examples in which the above specific polymer is obtained by polymerization, or copolymerization with other monomers, of the monomers having the hydroxyl-group-containing side chain of a molecular weight of 74 or more. These polymers are also commercially available.

A preferred example of the monomers having the hydroxyl-group-containing side chain of a molecular weight of 74 or more is a monomer having at least one side chain represented by the general formula —COOR (I) (wherein R is an alkyl group containing a hydroxyl group), which may include, for example, 2-hydroxymethyl acrylate or methacrylate (molecular weight of the side chain: 75), 2-hydroxyethyl acrylate or methacrylate (molecular weight of the side chain: 89), 3-hydroxypropyl acrylate or methacrylate (molecular weight of the side chain: 103), 4-hydroxybutyl acrylate or methacrylate (molecular weight of the side chain: 117), 5-hydroxypentyl acrylate or methacrylate (molecular weight of the side chain: 131), 6-hydroxyhexyl acrylate or methacrylate (molecular weight of the side chain: 145), 3-phenoxy-2-hydroxypropyl acrylate or methacrylate (molecular weight of the side chain: 195), 2,3-dihydroxypropyl acrylate or methacrylate (molecular weight of the side chain: 120), diethylene glycol monoacrylate or monomethacrylate (molecular weight of the side chain: 133), tetraethylene glycol monoacrylate or monomethacrylate (molecular weight of the side chain: 221), polyethylene glycol monoacrylate or monomethacrylate (molecular weight of the side chain: $44x+45$, wherein x is the polymerization degree of polyethylene glycol), polypropylene glycol monoacrylate or monomethacrylate (molecular weight of the side chain: $58x+45$, wherein x is the polymerization degree of polypropylene glycol), etc.

Another preferred example is a monomer having a side chain represented by the general formula —CONHR (II) (wherein R is an alkyl group containing a hydroxyl group), which may include, for example, N-methylol acrylamide or methacrylamide (molecular weight of the side chain: 74), N-hydroxyethyl acrylamide or methacrylamide (molecular weight of the side chain: 88), N-polyethylene glycol acrylamide or methacrylamide (molecular weight of the side chain: $44x+45$, wherein x is the polymerization degree of polyethylene glycol), etc.

Still another preferred example is a monomer having a side chain represented by the general formula —O—R (III) (wherein R is an alkyl group containing a hydroxyl group), which may include, for example, 3-hydroxypropyl vinyl ether (molecular weight of the side chain: 75), 4-hydroxybutyl vinyl ether (molecular weight of the side chain: 89), 5-hydroxypentyl vinyl ether (molecular weight of the side chain: 103), etc.

The hydroxyl-group-containing polymer used in the present invention may be a homopolymer comprising the specific monomers as described above, or may be a hydroxyl-group-containing copolymer obtained by copolymerizing any of the above specific monomers with other water-soluble monomers or hydrophobic monomers.

The water-soluble monomers used for the formation of the hydroxyl-group-containing copolymer may include, for example, anionic monomers such as acrylic acid, methacrylic acid, itaconic acid, maleic acid, maleic acid half ester, fumaric acid, styrenesulfonic acid and vinylsulfonic acid, or alkali metal salts, ammonium salts or amine salts, thereof; cationic monomers such as 4-vinylpyridine, N-trialkylaminomethylstyrene, 4-vinylimidazole, dialkyldiallyl ammonium salts, vinylbenzylaminosulfonium salts, vinylbenzylaminophosphonium salts, N,N-dimethylaminopropyl acrylate or methacrylate, N,N-dimethyl acrylamide or methacrylamide, N,N-dimethylaminoethyl acrylate or methacrylate, N,N-diethylaminoethyl acrylate or methacrylate, etc., or salts thereof; nonionic monomers such as acrylamide or methacrylamide; etc.

In copolymerization with the water-soluble monomers as described above, the above specific monomers may preferably be used in the proportion of 20% by weight or more of the total amount of the monomers. Use thereof in the amount less than 20% by weight may make it difficult to obtain the desired effect of the present invention. The above specific monomers can also be copolymerized with the hydrophobic monomer, and such hydrophobic monomers may include, for example, methacrylates or acrylates such as methyl acrylate or methacrylate, butyl acrylate or methacrylate, ethylhexyl acrylate or methacrylate, glycidyl acrylate or methacrylate and dodecyl acrylate or methacrylate, vinyl acetate, vinyl chloride, vinylidene chloride, styrene, dicyclopentadiene, ethylene, propylene, etc.

To copolymerize the above specific hydroxyl-group-containing monomers with such hydrophobic monomer, the above specific monomers may preferably comprise about 40% by weight or more of the total amount of the monomers. Use of the specific monomers in the amount less than 40% by weight may make too poor the hydrophilic nature of the resulting copolymer in order to achieve sufficient ink receptivity.

The above specific hydroxyl-group-containing monomers may be of course further copolymerized with the above water-soluble monomers and the hydrophobic monomers. Also in such an instance, the above specific monomers may preferably comprise about 20% by weight or more of the total amount of the monomers.

The specific hydroxyl-group-containing monomers, water soluble monomers and hydrophobic monomers as described above are merely shown as examples, and any other known monomers can be also used in the present invention.

Of the above specific hydroxyl-group-containing monomers, particularly preferred are acrylic monomers. For example, a coating excellent in the strength, water resistance, transparency, light-resistance and other coating properties and desirable as an ink-receiving layer can be formed when about 20 to 100% by weight of the total monomers is comprised of the acrylic monomers.

The polymer as described above may preferably have a molecular weight approximately of 5,000 to 1,000,000. The polymer of the molecular weight of less than 5,000 may lower the coating strength of the ink-receiving layer to be formed, and may cause the problems that the surface becomes sticky. On the other hand, the polymer of the molecular weight of more than 1,000,000 may make overly high the viscosity of the polymer solution to cause a problem in operating the formation of the ink-receiving layer, or may undesirably lower the leveling of the ink-receiving layer to be formed. More preferably, the polymer may have a weight average molecular weight of 10,000 to 500,000. The solvent used for dissolving such resins may chiefly include alcohol type solvents such as isopropanol and butanol, ketones and cellosolves such as methyl ethyl ketone and butyl cellosolve, and dimethylformamide.

Besides the polymer in which the molecular weight of the hydroxyl-group-containing side chain is 74 or more as described above, there is known a large number of water-soluble or hydrophilic polymers, but, in the case of polymers in which the molecular weight of the hydroxyl-group-containing side chain is less than 74, for example, polyvinyl alcohol (molecular weight of the side chain: 17), polyvinyl butyral (molecular weight of the side chain: 17), hydroxyethyl cellulose (molecular weight of the side chain: 61), etc., it has occurred that the ink receptivity of the ink-receiving layer to be formed becomes poor, the printed portion becomes sticky because of a high water-solubility, or the strength of water resistance becomes poor.

In respect of the above (3), as the ethylene oxide polymer having an average molecular weight of 100,000 or more, or a copolymer mainly comprised of ethylene oxide, or a modified product of these, it may include the ethylene oxide polymer having an average molecular weight 100,000 or more or the copolymer mainly comprised of ethylene oxide, or the modified product obtained by reacting any of these with 0.01 to 5% by weight of mono- or polyisocyanate in order to lower the water-solubility of these, as described in Japanese Patent Publication No. 36280/1975. Particularly preferred is this modified product as it can form an ink-receiving layer of excellent waterresistance. The solvent used for such resins may include, for example, isopropanol, toluene, etc.

Next, the solvent-insoluble resin (hereinafter "resin (B)") that is capable of absorbing water in an amount of 50 times or more and preferably 1,500 times or less as much as its own weight is a resin having been made solvent-insoluble by three-dimensionally cross-linking very highly water-soluble or hydrophilic resins, and also capable of absorbing water in an amount of 50 times or more as much as its own weight by incorporating the water into the three-dimensional network structure. It may include, for example, as disclosed in Japanese Unexamined Patent Publications No. 173194/1982 and No. 24492/1983, sodium polyacrylate, resins of vinyl alcohol/acrylamide copolymer types, sodium acrylate/acrylamide copolymer types, cellulose types (carboxymethyl compounds or graft polymers) or starch types (hydrolysates of acrylnitrile grafted compounds or acrylic acid grafted compounds), etc.

In the present invention, the amount of absorption of water, relative to resin (A)'s own weight and resin (B)'s own weight, can be measured by measuring the water absorption to be found when the respective resins are dipped in ion-exchange water of 25° C. for 10 minutes.

In instances in which ink-receiving layers were formed by using, in combination with resin A mentioned above, polystyrene, polymethyl methacrylate, polyvinyl butyral, highly saponified polyvinyl alcohol, water-dispersed copolymerized polyester or the like that can be solvent-soluble, water-soluble or water-dispersible as disclosed in Japanese Unexamined Patent Publications No. 173194/1982, No. 74879/1986 and No. 46290/1985, but can not absorb the water in the amount of 0.5 times or more as much as its own weight, the ink absorption of the ink-receiving layers was found to be so greatly poor that the ink can not be fixed to the end.

Resin (A) may preferably give no stickiness to the surface in the state of a solid, taking account of the operation at the time when the ink-receiving layer is formed and when the recording is performed. Also for the purpose of imparting the water resistance, resin (A) may preferably be substantially water-insoluble, as it was found to be of no practical use to use, for example, a water-soluble resin such as water-soluble polyvinyl pyrrolidone. What is meant by "substantially water-insoluble" is that 90% or more of resin (A) is water-insoluble when placed in water for 5 minutes at room temperature.

If resin (A) is not solvent-soluble but water-soluble as in Japanese Unexamined Patent Publication No.

46290/1985, it follows that, when a coating solution to be used in the formation of the ink-receiving layer is prepared, said resin (A) is mixed in an aqueous system with resin (B) which is solvent-insoluble. As a result, since resin (B) is a resin of a highly water-absorbing property, it may occur that resin (B) is greatly swelled or the coating solution is thickened, resulting in the difficulty in handling, and it becomes very difficult to obtain the recording medium of the present invention.

Resin (B) may preferably be capable of absorbing water in an amount of 50 times or more, preferably 100 times or more, as much as its own weight, taking account of the ink-absorbing property of the ink-receiving layer. In the amount less than 50 times, the ink-absorbing speed of the resulting ink-receiving layer may be so slow that there may be caused the disadvantages such that non-uniformity of ink appears in the prints and the fixing of ink becomes slow, undesirably.

This resin (B) may preferably be used in the form of fine powder by dispersing and mixing it in the solution of the solvent-soluble resin (A). Thus, it may desirably have an average particle size of 0.5 to 30 μm, preferably 0.5 to 20 μm, and more preferably 0.5 to 15 μm, from the viewpoints of the low haze, high glossiness, soft feeling of the surface, uniform ink-absorbing speed and uniform resolution, of the ink-receiving layer to be formed.

The proportion of resin (B) to the above resin (A) may desirably be such that the weight ratio of resin (A) to resin (B) is 1:10 to 15:1, preferably 1:5 to 10:1, in order to obtain the ink-receiving property, low-hazing property, high glossiness and non-beading property of the ink-receiving layer. An overly larger amount of resin (A) may result in a poor ink-absorbing property, and on the other hand an overly lower amount of resin (B) may make it impossible to obtain the desired performances such as the low-hazing property, high glossiness and so forth, undesirably.

The ink-receiving layer of the recording medium of the present invention is formed by using the resin (A) and resin (B) as described above, but, in the present invention, in addition to the resin (A) and resin (B) as described above, additional light-transmissive polymers may be used in combination with the above resin (A) and resin (B) so long as the objects of the present invention may not be precluded.

Such additional polymers may include natural resins such as albumin, gelatin, casein, starch, cationic starch, gum arabic and potassium alginate; synthetic resins such as polyvinyl alcohol, polyamide, polyacrylamide, quaternary polyvinyl pyrrolidone, polyethyleneimine, polyvinylpyridylium halide, melamine resins, polyurethane, polyester and sodium polyacrylate, and one or more of any of these materials can be used in combination as desired.

In order to reinforce the strength of the inkreceiving layer and/or improve the adhesion between it and the substrate, there may also be optionally used resins such as SBR latex, NBR latex, polyvinyl formal, polymethyl methacrylate, polyvinyl butyral, polyacrylonitrile, polyvinyl chloride, polyvinyl acetate, phenol resins and alkyd resins.

In order to enhance the ink-absorbing property of the ink-receiving layer, a filler such as silica, clay, talc, diatomaceous earth, calcium carbonate, calcium sulfate, barium sulfate, aluminum silicate, synthetic zeolite, alumina, zinc oxide, lithopone and satin white can be also dispersed in the ink-receiving layer.

It is also effective for the ink-receiving layer to contain a surface active agent of an anionic, nonionic or cationic type so that the ink-absorbing speed can be increased and the stickiness of the printed portion can be better prevented.

The substrate used in the present invention as a support for the ink-receiving layer may be any of conventionally known transparent or opaque substrates. Preferable examples of the transparent substrates may include, for example, films, sheets, glass sheets, etc. of polyester resins, diacetate resins, triacetate resins, acrylic resins, polycarbonate resins, polyvinyl chloride resins, polyimide resins, cellophane, celluloid, etc. The opaque substrates may preferably include, for example, ordinary paper, cloths, metal sheets, and synthetic paper, as well as those treated to make opaque the above transparent substrates according to a known means.

The recording medium of the present invention can be produced by using the chief materials as mentioned above, and the preferred embodiment (1) mentioned before is an embodiment wherein both of the substrate and the ink-receiving layer are light transmissive, having the linear transmittance of 10% or more, and the recording medium is light transmissive as a whole.

The recording medium according to this embodiment, having a good light transmission properties in particular, is mainly used in the instances where the recorded images are projected on a screen by means of an optical equipment such as OHP, and is useful as a recording medium for observation of transmitted light.

Such a light transmissive recording medium can be prepared by forming on the light transmissive substrate as mentioned above a light transmissive ink-receiving layer made from a mixture comprising the above-mentioned resin (A) and resin (B) only, or a mixture thereof with the additional light-transmissive polymer.

As a method for forming such an ink-receiving layer, preferred is a method comprising dissolving or dispersing the above mixture comprising resin (A) and resin (B) only or the mixture thereof with the additional suitable polymer in a suitable solvent to prepare a coating solution, and applying the coating solution onto the light transmissive substrate by a known coating method such as roll coating, rod bar coating, spray coating and air knife coating, followed by immediately drying. Other methods may be also available, such as a method in which the above mixture comprising resin (A) and resin (B) only or the mixture thereof with the additional polymer is applied by hot melt coating or a method in which film for the ink-receiving layer is independently formed in advance from the materials as mentioned above and the film is then laminated on the substrate.

The recording medium produced as above according to the embodiment (1) is a light-transmissive recording medium having sufficient light transmission properties.

The sufficient light transmission property mentioned in the present invention means that the recording medium has a linear transmittance of at least 2%, preferably, of 10% or more.

The light transmission of 2% or more makes it possible to observe recorded images by projecting them on a screen by using, for example, OHP. In order to observe the details of recorded images, the recording medium should desirably have the linear transmittance of 10% or more.

The linear transmittance T (%) herein used is a value obtained by measuring, with use of, for example, Type 323 Hitachi Autographic Spectrophotometer (manufactured by Hitachi Ltd.), spectral transmittance of linear light vertically incident on a sample, the linear light transmitting through the sample, and passing through a slit provided at least 8 cm distant from the sample at the light-receiving side on an extension line of the incident light path; by determining further the value Y of the tristimulus value of color from the spectral transmittance thus measured; and calculating it according to the following formula:

$$T = Y/Yo \times 100 \quad (1)$$

wherein

T: linear transmittance; p1 Y: Value Y of the sample; and

Yo: Value Y of a blank.

Accordingly, the linear transmittance referred to in the present invention is concerned with the linear light, and is different from the evaluation of the light transmission properties by diffused light, such as the diffused transmittance (i.e., the light transmittance of the light including diffused light, determined by providing an integrating sphere at a rear portion of a sample) and the opacity (determined from the ratio obtained by applying a white and black lining to the back of a sample).

Since what is questioned in equipments utilizing optical techniques is the behavior of linear light, it is particularly important to determine the linear transmittance of a recording medium in order to evaluate the light transmission properties of a recording medium intended for use in such equipments.

For example, when projected images are observed by OHP, it is required that non-recording portions in the projected images are bright, in other words, the linear transmittance of a recording medium is higher than a given level, in order to obtain sharp and clear images having a high contrast between recording portions and non-recording portions. According to a test by means of a test chart using OHP, the linear transmittance of a recording medium is required to be 2% or more to obtain images answering the above object, and preferably 10% or more to obtain sharper images. Thus, the recording medium that can answer this object is required to have a linear transmittance of 2% or more.

Another preferred embodiment (2) mentioned before, which can be also another embodiment of the above embodiment (1), is characterized in that the surface of its ink-receiving layer is smooth to have a 45° specular gloss of 30% or more according to JIS Z8741.

The recording medium of this type has a good surface gloss in particular, and is particularly useful as a recording medium for the surface image observation, having good sharpness in full color. The recording medium according to this embodiment may be either transparent or opaque, for which either of the above transparent substrate or the opaque one can be used. Also, the ink-receiving layer formed on these substrate may also be transparent or opaque. The materials and the method employed for the formation of the ink-receiving layer can be the same as in the above embodiment (1), but the fillers mentioned above may be used at a level that may make opaque the ink-receiving layer so long as the surface of the ink-receiving layer can retain the smoothness.

If necessary, the cast coating method may be employed in place of the above coating methods, or glossing may be carried out by using a glossing roll.

In the present invention as described above, the ink-receiving layer formed on the substrate has a thickness usually of about 1 to 200 $\mu m$, preferably about 1 to 100 $\mu m$, and more preferably about 2 to 30 $\mu m$.

In the present invention, the recording medium of every type of the embodiments as described above can be also provided on its recording face with organic or inorganic fine power in the proportion of about 0.01 to about 1.0 $g/m^2$, whereby it is made possible to further improve the carrying performance in a printer, blocking resistance when overlapped, and fingerprint resistance, of the resulting recording medium.

In the above, the present invention has been described by exemplifying typical embodiments of the recording medium of the invention, but, of course, the recording medium of the invention is by no means limited to these embodiments. In any of the embodiments, the ink-receiving layer may contain a variety of known additives such as dispersants, fluorescent dyes, pH adjusters, antifoamers, lubricants and antiseptics.

The recording medium of the present invention may not necessarily be colorless, and a colored recording medium may also be available.

The above recording medium of the present invention can show excellent ink receptivity like the conventional ones in which the ink-receiving layer is formed by use of the water-soluble polymer, and can give recorded images which are free from beading and have a good sharpness. Moreover, it may not occur that its surface turns sticky or tacky even under the condition of a high humidity.

Accordingly, in a unicolor recording as well as a full color recording, there can be obtained recorded images with high resolution and high sharpness free from runover or bleeding of ink even when inks of different color have been applied overlappingly on the same portion in a short time.

Moreover, unlike the conventional recording mediums in which the water-soluble polymer is used, the recording medium of the present invention can be perfectly free from the stickiness or tackiness on the surface of the ink-receiving layer even when the recording like the above mentioned is carried out under the condition of a high humidity. Accordingly, there may arise no trouble in the printer and also may occur no blocking or no color migration even when recording mediums are laid overlapping each other.

In the present invention, it is possible to provide a recording medium having an excellent surface gloss that has not been attained in the conventional recording mediums for ink-jet recording, and to apply it in the use other than the conventional surface image observation, such as the use for observation of images by projecting recorded images on a screen or the like by means of optical equipments such as a slide and an OHP, for a color separation plate used when producing a positive plate for color printing, or for a CMF used for color display by liquid crystals.

The present invention will be described below in greater detail by giving Examples. Herein, part(s) or % is by weight, unless particularly mentioned.

EXAMPLE 1

Mixed were 70 parts by weight of an aqueous 10% solution of polyvinyl pyrrolidone (PVPK-90; available from GAF Corp.) and 30 parts of an aqueous 10% solution of methyl vinyl ether/maleic anhydride copolymer (GANTREZ AN-169, available from GAF Corp.). The mixed solution turns into a gel to form a polymer complex (resin (A)), but can get to be a solution by adding 100 parts of N,N-dimethylformamide in this mixed solution and heating the mixture to 90° C. This solution was designated as resin (A). As resin (B), a sodium acrylate polymer (NP-1010; available from Sumitomo Chemical Co., Ltd.; average particle size: 10 μm) in the amount corresponding to A:B=5:1 was mixed and dispersed in the above solution, which is used as a coating solution.

Using a polyethylene terephthalate film of 100 μm thick (available from Toray Industries, Inc.) as a light transmissive substrate, the film was coated with the coating solution having the above composition according to the bar coater method so as to have a film thickness of 10 μm after dried, followed by drying under the conditions of 110° C. and a period of 10 minutes to obtain a light-transmissive recording medium.

The recording medium of the present invention thus obtained was colorless and almost transparent.

EXAMPLES 2 TO 4 AND COMPARATIVE EXAMPLES 1 to 4

Coating solutions were prepared in the same manner as in Example 1 by use of compositions comprising the mixture of resin (A) and resin (B) shown below. Ink-receiving layers were provided in the same manner as in Example 1 on polyethylene terephthalate films same as used in Example 1 to obtain 3 kinds of the light-transmissive recording mediums according to the embodiment (1) mentioned above and 4 kinds of comparative recording mediums.

EXAMPLE 5

A coating solution was prepared in the same manner as in Example 1 by use of a composition comprising the mixture of resin (A) and resin (B) shown below. An ink-jet receiving layer was provided in the same manner as in Example 1 except that a white film (Melinex #329, available from ICI) was used as the substrate in place of the polyethylene terephthalate film used in Example 1, to obtain a recording medium of the present invention according to the embodiment (2) mentioned above.

EXAMPLES 6 to 8 AND COMPARATIVE EXAMPLES 5 AND 6

Coating solutions were prepared in the same manner as in Example 1 by use of compositions comprising the mixture of resin (A) and resin (B) shown below. Ink-receiving layers were provided in the same manner as in Example 1 except that sheets of cast coated paper (Mirrorcoat, available from Kanzaki Paper Mfg. Co., Ltd.) were used as the substrates in place of the polyethylene terephthalate film used in Example 1, to obtain recording mediums of the present invention according to the embodiment (2) mentioned above and comparative recording mediums.

EXAMPLE 2

| (A) : (B) = 1 : 2 | |
|---|---|
| (A); | |
| Polyvinyl pyrrolidone (PVPK-90; available from GAF Corp.; an aqueous 10% solution) | 70 parts |
| Methyl vinyl ether/maleic anhydride monoethyl ester copolymer (GANTREZ ES 425; available from GAF Corp.; a 10% ethanol solution) | 30 parts |
| (B); | |
| Acrylic acid/vinyl alcohol copolymer (available from Sumitomo Chemical Co., Ltd.; SP-510; 510; 10 μm) | |

-continued

EXAMPLE 3

| (A) : (B) = 10 : 1 | |
|---|---|
| (A); | |
| Polyvinyl pyrrolidone (PVPK-90; available from GAF; an aqueous 10% solution) | 80 parts |
| Isobutylene/maleic anhydride copolymer (Isoban 10; available from Kuraray Isoprene; a 10% DMF solution) | 20 parts |
| (B); | |
| Acrylic acid/acrylamlde copolymer (available from Kyoritsu Yuki Co., Ltd.; Hymosub 200; a milled product; 5 μm) | |

EXAMPLE 4

| (A) : (B) = 5 : 1 |
|---|
| (A); |
| Modified polyethylene oxide (available from Meisei Chemical Works, Ltd.; L620; a 10% isopropanol solution) |
| (B); |
| Starch/acrylic acid copolymer (available from Sanyo Kasei; Sunwet IM1000; a milled product; 8 μm) |

EXAMPLE 5

| (A) : (B) = 2 : 1 |
|---|
| (A); |
| 2-Hydroxyethyl methacrylate/methyl methacrylate = 9:1 copolymer (a 10% isopropanol solution) |
| (B); |
| Sodium acrylate polymer (available from Sumitomo Chemical Co., Ltd.; NP-1010; 10 μm) |

EXAMPLE 6

| (A) : (B) = 5 : 1 | |
|---|---|
| (A); | |
| Polyvinyl pyrrolidone (a 10% isopropanol solution) | 56 parts |
| Methyl vinyl ether/maleic monoethyl ester copolymer (a 10% ethanol solution) | 19 parts |
| D-sorbitol/benzaldehyde condensate (Gelol D; available from Shin-Nippon Chemical Industries Co., Ltd.; a 10% DMF solution) | 25 parts |
| (B); | |
| Starch polyacrylonitrile graft body (available from Nichiden Kagaku; WAS; a milled product; 1 μm) | |

EXAMPLE 7

| (A) : (B) = 4 : 1 |
|---|
| (A); |
| Poly 2-(hydroxyethyl)methacrylate (a 10% isopropanol/methyl ethyl ketone = 1:1 solutlon) |

-continued

| (A) : (B) = 4 : 1 |
|---|
| (B): |
| Acrylic acid/vinyl alcohol copolymer (Sumitomo Chemical Co., Ltd.; SP-520; 20 μm) |

EXAMPLE 8

| (A) : (B) = 10 : 1 | |
|---|---|
| (A): | |
| Polyvinyl pyrrolidone (PVPK-90; available from GAF Corp.; a 10% DMF solution) | 80 parts |
| Styrene acrylic acid (Oxyluck SH-2100; available from Nippon Shokubai Kagaku Kogyo Co., Ltd.; a 10% DMF solution) | 20 parts |
| (B): | |
| Sodium polyacrylate (available from Sumitomo Chemical Co., Ltd.; NP-1010; 10 μm) | |

COMPARATIVE EXAMPLE 1

Polyvinyl alcohol (PVA-217; available from Kuraray Co., Ltd.): 10 parts
Water: 90 parts

COMPARATIVE EXAMPLE 2

Polyvinyl pyrrolidone (PVPK-90 available from GAF Corp.): 10 parts
Water: 90 parts

COMPARATIVE EXAMPLE 3

Polyvinyl pyrrolidone (PVPK-90 available from GAF Corp.): 50 parts
Polyvinyl alcohol (PVA-220; available from Kuraray Co., Ltd.): 50 parts

COMPARATIVE EXAMPLE 4

Polyvinyl pyrrolidone (PVPK-90 available from GAF Corp.) was used as resin (A) in Example 1.

COMPARATIVE EXAMPLE 5

Modified polyethylene oxide (available from Meisei Chemical Works, Ltd.; P-900; a milled product; 35 μm) having an water absorption of 20 times was used as the particles of resin (B) in Example 7.

COMPARATIVE EXAMPLE 6

Polyvinyl butyral (available from Sekisui Chemical Co., Ltd.; Eslec BL-S) having an water absorption of 0.5 time was used as resin (A) in Example 8.

On each of the recording mediums obtained in the above Examples and Comparative Examples, ink-jet recording was carried out using a recording apparatus equipped with an on-demand type ink-jet recording head capable of forcing ink to eject by means of a piezoelectric oscillator (ejection orifice diameter: 60 μm; drive voltage of piezoelectric oscillator: 70 V; frequency: 2 kHz), with use of the following four kinds of ink.

| | |
|---|---|
| Yellow ink (composition) | |
| C. I. Direct Yellow 86 | 2 parts |
| Diethylene glycol | 20 parts |
| Polyethylene glycol #200 | 10 parts |
| Water | 70 parts |
| Magenta ink (composition) | |

-continued

| | |
|---|---|
| C. I. Acid red 35 | 2 parts |
| Diethylene glycol | 20 parts |
| Polyethylene glycol #200 | 10 parts |
| Water | 70 parts |
| Cyan ink (composition) | |
| C. I. Direct Blue 86 | 2 parts |
| Diethylene glycol | 20 parts |
| Polyethylene glycol #200 | 10 parts |
| Water | 70 parts |
| Black ink (composition) | |
| C. I. Food Black 2 | 2 parts |
| Diethylene glycol | 20 parts |
| Polyethylene glycol #200 | 10 parts |
| Water | 70 parts |

Results obtained from evaluations on the recording mediums according to Examples and Comparative Examples are shown in Table 1.

The respective evaluation items in Table 1 were measured according to the following methods:

(1) Ink fixing time was measured in terms of the time required for ink to be dried so as not to stick to fingers when recorded images were touched with fingers after a recording medium on which recording had been performed was left at room temperature (20° C., 65% RH).

(2) Dot density was measured on black dots by applying JIS K7505 to printed microdots with use of Sakura Microdensitometer PDM-5 (available from Konishiroku Photo Industry, Ltd.).

(3) OHP suitability was measured as OHP is a typical example of optical equipments, and judged by visual observation of images formed by projecting recorded images on a screen by using OHP. Where non-recording portions of a sample were bright, recorded images had a high OD (optical density), and sharp and clear projected images having a high contrast were obtained, the sample was evaluated as O; where non-recording portions of a sample were somewhat dark, recorded images had a somewhat low OD, and a line of 0.5 mm in pitch width and 0.25 mm in thickness could not be clearly distinguished, the sample was evaluated as Δ; and where non-recording portions of a sample were considerably dark, recorded images had a considerably low OD, and a line of 1 mm in pitch width and 0.3 mm in thickness could not be clearly distinguished or there was no distinction between non-recording portions and recording portions, the sample was evaluated as X.

(4) Linear transmittance was determined according to the above formula (I), by measuring spectral transmittance using Type 323 Hitachi Autographic Spectrophotometer (available from Hitachi Ltd.), keeping a window at the light-receiving side at about 9 cm distant from the sample.

(5) Carrying performance of a sample was determined in the following manner: When a recording medium was set in a printer under the conditions of 35° C. and 85% RH, the sample that could not be carried by a carrying roll of the printer because of the stickiness of the surface of the ink-receiving layer and could not perform the recording was evaluated as X; and the sample to the contrary, as O.

(6) Blocking resistance of a sample was measured in the following manner: Twelve hours after printing, a sheet of woodfree paper was brought into close contact with the face of prints, and stored for 12 hours as it is. After storage, the sample that caused no sticking between the recording medium and the woodfree paper was evaluated as O; and the sample to the contrary, as X.

(7) Gloss was measured according to JIS Z-8741 for 45° specular gloss with use of a digital varied-angle glossmeter UGV-5D (available from Suga Shikenki K. K.).

(8) Non-beading property of a sample was organoleptically evaluated by visual observation of non-uniformity of images on the solid-printed portion at which two kinds of the above ink were overlapped in full dots. The sample in which the dots are irregularly connected to show remarkable image non-uniformity was evaluated as X; the sample in which the non-uniformity is seen slightly, although not so unsightly, as Δ; and the sample in which little non-uniformity is seen, as O.

TABLE 1

| | Example | | | |
|---|---|---|---|---|
| | 1 | 2 | 3 | 4 |
| Ink fixing time (min): | 1 | 0.5 | 1 | 2 |
| Dot density: | 1.1 | 1.0 | 1.2 | 1.1 |
| OHP suitability: | O | O | O | O |
| Linear transmittance | 69% | 68% | 70% | 70% |
| Carrying performance | O | O | O | O |
| Blocking: | O | O | O | O |
| Gloss: | — | — | — | — |
| Non-beading property: | O | O | O | O |

| | Example | | | |
|---|---|---|---|---|
| | 5 | 6 | 7 | 8 |
| Ink fixing time (min): | 0.5 | 1 | 1 | 1 |
| Dot density: | 1.4 | 1.2 | 1.3 | 1.1 |
| OH suitability: | — | — | — | O |
| Linear transmittance: | — | — | — | 68% |
| Carrying performance: | O | O | O | O |
| Blocking: | O | O | O | O |
| Gloss: | 73% | 59% | 59% | — |
| Non-beading property: | O | O | O | O |

| | Comparative Example | | |
|---|---|---|---|
| | 1 | 2 | 3 |
| Ink fixing time (min): | 20 | 10 | 12 |
| Dot density: | 1.0 | 1.0 | 0.9 |
| OHP suitability: | O | O | O |
| Linear transmittance: | 72 | % 70% | 73% |
| Carrying performance: | X | X | X |
| Blocking: | X | X | X |
| Gloss: | — | — | — |
| Non-beading property: | X | Δ | X |

| | Comparative Example | | |
|---|---|---|---|
| | 4 | 5 | 6 |
| Ink fixing time (min): | 6 | 10 | 60 |
| Dot density: | 0.8 | 1.0 | 1.3 |
| OHP suitability: | O | — | — |
| Linear transmittance: | 70% | — | — |
| Carrying performnce: | X | O | O |
| Blocking: | X | O | O |
| Gloss: | — | 29% | 58% |
| Non-beading property: | O | O | X |

We claim:

1. A recording medium comprising a substrate and an ink-receiving layer provided on said substrate, wherein said ink-receiving layer contains in combination, solvent-soluble resin (A) that is capable of absorbing water in an amount of at least 0.5 times as much as its own weight and is substantially water-insoluble, and particles of solvent-insoluble resin (B) that is capable of absorbing water in an amount of at least 50 times as much as its own weight, wherein said resin (A) is selected from the group consisting of (a) a polymer complex comprising a basic polymer and an acidic polymer;

(b) a resin containing a repeating unit wherein a side chain having a hydroxyl group has a molecular weight of at least 74; and (c) any of an ethylene oxide polymer having an average molecular weight of at least 100,000, a copolymer mainly comprising ethylene oxide, or a less water-soluble product of at least one of said ethylene oxide polymer or copolymer with monoisocyanate or polyisocyanate; and wherein said resin (B) is a resin selected from the group consisting of sodium polyacrylate, vinyl alcohol/acrylamide polymer, sodium acrylate/acrylamide copolymer, carboxymethyl polymers and graft polymers, and hydrolysates of acrylonitrile or acrylic acid grafted compounds.

2. The recording medium of claim 1, wherein said resin (A) and resin (B) are mixed in the proportion ranging between 1:10 and 15:1 in weight ratio of resin (A) to resin (B).

3. The recording medium of claim 1, wherein said resin (A) is a polymer complex comprising a basic polymer and an acidic polymer.

4. The recording medium of claim 1, wherein said resin (A) is a resin containing a repeating unit of which a side chain having a hydroxyl group has a molecular weight of at least 74.

5. The recording medium of claim 1, wherein said particles of resin (B) are particles of a resin formed by three-dimensional cross-linking of highly water-soluble or hydrophilic resins.

6. The recording medium of claim 1, wherein the surface of said ink-receiving layer has a 45° specular gloss of at least 30% or more according to JIS Z8741.

7. The recording medium of claim 1, wherein said ink-receiving layer has a thickness ranging between 1 and 200 μm.

8. The recording medium of claim 1, wherein said particles of resin (B) have a particle size ranging between 0.5 and 30 μm.

9. The recording medium of claim 1, wherein said particles of resin (B) have a particle size ranging between 0.5 and 20 μm.

10. The recording medium of claim 1, wherein said ink-receiving layer is non-porous.

11. A light-transmissive recording medium comprising a light-transmissive substrate and an ink-receiving layer provided on said substrate, wherein said ink-receiving layer contains in combination, solvent-soluble resin (A) that is capable of absorbing water in an amount of at least 05 times as much as its own weight and is substantially water-insoluble, and particles of solvent-insoluble resin (B) that is capable of absorbing water in an amount of at least 50 times as much as its own weight, wherein said resin (A) is selected from the group consisting of (a) a polymer complex comprising a basic polymer and an acidic polymer;

(b) a resin containing a repeating unit wherein a side chain having a hydroxyl group has a molecular weight of at least 74; and (c) any of an ethylene oxide polymer having an average molecular weight of at least 100,000, a copolymer mainly comprising ethylene oxide, or a less water-soluble product of at least one of said ethylene oxide polymer or copolymer with monoisocyanate or polyisocyante; and wherein said resin (B) is a resin selected from the group consisting of sodium polyacrylate, vinyl alcohol/acrylamide polymer, sodium acrylate/acrylamide copolymer, carboxymethyl polymers and graft polymers, and hydrolysates of acrylonitrile or acrylic acid grafted compounds.

12. The recording medium of claim 1, wherein said recording medium has a linear transmittance of at least 2%.

13. The recording medium of claim 1, wherein said recording medium has a linear transmittance of at least 10%.

14. The recording medium of claim 11, wherein said resin (A) and resin (B) are mixed in the proportion ranging between 1:10 and 15:1 in weight ratio of resin (A) to resin (B).

15. The recording medium of claim 11, wherein said resin (A) is a polymer complex comprising a basic polymer and an acidic polymer.

16. The recording medium of claim 11, wherein said resin (A) is a resin containing a repeating unit of which a side chain having a hydroxyl group has a molecular weight of at least 74.

17. The recording medium of claim 11, wherein said particles of resin (B) are particles of a resin formed by three-dimensional cross-linking of highly water-soluble or hydrophilic resins.

18. The recording medium of claim 11, wherein said ink-receiving layer has a thickness ranging between 1 and 200 μm.

19. The recording medium of claim 11, wherein said particles of resin (B) have a particle size ranging between 0.5 and 30 μm.

20. The recording medium of claim 11, wherein said particles of resin (B) have a particle size ranging between 0.5 and 20 μm.

21. The recording medium of claim 11, wherein said ink-receiving layer is non-porous.

22. An ink-jet recording process comprising impinging droplets of a recording solution containing a water-soluble dye on a recording medium having an ink-receiving layer, wherein said ink-receiving layer contains in combination, solvent-soluble resin (A) that is capable of absorbing water in an amount of at least 0.5 times as much as its own weight and is substantially water-insoluble, and particles of solvent-insoluble resin (B) that is capable of absorbing water in an amount of at least 50 times as much as its own weight, wherein said resin (A) is selected from the group consisting of (a) a polymer complex comprising a basic polymer and an acidic polymer;

(b) a resin containing a repeating unit wherein a side chain having a hydroxyl group has a molecular weight of at least 74; and (c) any of an ethylene oxide polymer having an average molecular weight of at least 100,000, a copolymer mainly comprising ethylene oxide, or a less water-soluble product of at least one of said ethylene oxide polymer or copolymer with monoisocyanate or polyisocyanate; and wherein said resin (B) is a resin selected from the group consisting of sodium polyacrylate, vinyl alcohol/acrylamide polymer, sodium acrylate/acrylamide copolymer, carboxymethyl polymers and graft polymers, and hydrolysates of acrylonitrile or acrylic acid grafted compounds.

23. The recording process of claim 22, wherein said resin (A) and resin (B) are mixed in the proportion ranging between 1:10 and 15:1 in weight ratio of resin (A) to resin (B).

24. The recording process of claim 22, wherein said resin (A) is a polymer complex comprising a basic polymer and an acidic polymer.

25. The recording process of claim 22, wherein said resin (A) is a resin containing a repeating unit of which a side chain having a hydroxyl group has a molecular weight of at least 74.

26. The recording process of claim 22, wherein said particles of resin (B) are particles of a resin formed by three-dimensional cross-linking of highly water-soluble or hydrophilic resins.

27. The recording process of claim 22, wherein said ink-receiving layer has a thickness ranging between 1 and 200 μm.

28. The recording process of claim 22, wherein said particles of resin B have a particle size ranging between 0.5 and 30 μm.

29. The recording process of claim 22, wherein said particles of resin B have a particle size ranging between 0.5 and 20 μm.

30. The recording process of claim 22, wherein said ink-receiving layer is non-porous.

31. The recording process of claim 22, wherein said recording medium has a linear transmittance of at least 2%.

32. The recording process of claim 22, wherein said recording medium has a linear transmittance of at least 10%.

33. The recording process of claim 22, whereinthe surface of said ink-receiving layer has a 45° specular gloss of at least 30% according to JIS Z8741.

34. The recording medium of claim 1, wherein said resin (A) and resin (B) are mixed in a proportion ranging between 1:5 and 10:1 in weight ratio of resin (A) to resin (B).

35. The recording medium of claim 11, wherein said resin (A) and resin (B) are mixed in a proportion ranging from between 1:5 to 10:1 in weight ratio of resin (A) to resin (B).

36. The recording process of claim 22, wherein said resin (A) and resin (B) are mixed in a proportion ranging between 1:5 to 10:1 in weight ratio of resin (A) to resin (B).

* * * * *

UNITED STATES PATENT AND TRADEMARK OFFICE

CERTIFICATE OF CORRECTION

PATENT NO. : 4,887,097

DATED : December 12, 1989

INVENTOR(S) : Akiya, et al.

It is certified that error appears in the above-identified patent and that said Letters Patent is hereby corrected as shown below:

ON THE TITLE PAGE,
[56] References Cited:

Under U.S. PATENT DOCUMENTS:

Line 5, "4,554,181 11/1985 Cousin" should read --4,554,181 11/1985 Cousin, et al.--.

Line 7, "4,701,837 10/1987 Sakaki" should read --4,701,837 10/1987 Sakaki, et al.--.

Line 8, "4,711,830 12/1987 Haruta" should read --4,711,830 12/1987 Haruta, et al.--.

Under OTHER PUBLICATIONS:

Line 4, "Japanese Patent No. 59-215890 (12/15/84)" should read --Japanese Patent No. 59-215890 (12/5/84)--.

COLUMN 1:

Line 21, "foa-" should read --foam--.

Line 22, "mis" should read --is--.

Line 34, "therre" should read --there--.

UNITED STATES PATENT AND TRADEMARK OFFICE
CERTIFICATE OF CORRECTION

PATENT NO. : 4,887,097 Page 2 of 5
DATED : December 12, 1989
INVENTOR(S) : Akiya, et al.

It is certified that error appears in the above-identified patent and that said Letters Patent is hereby corrected as shown below:

COLUMN 2:

Line 9, "use" should read --uses--.

Line 12, "equipments" should read --equipment--.

Line 25, "and" should be deleted.

Line 26, "in" should read --and in--.

COLUMN 3:

Line 19, "equipments" should read --equipment--.

Line 54, "time" should read --times--.

Line 62, "mediumof" should read --medium of--.

COLUMN 4:

Line 6, "eachof" should read --each of--.

Line 11, ""resin A")" should read --"resin (A)")--

UNITED STATES PATENT AND TRADEMARK OFFICE

CERTIFICATE OF CORRECTION

PATENT NO. : 4,887,097

DATED : December 12, 1989

INVENTOR(S) : Akiya, et al.

It is certified that error appears in the above-identified patent and that said Letters Patent is hereby corrected as shown below:

COLUMN 8:

Line 11, "weight" should read --weight of--.

Line 18, "waterresistance" should read --water-resistance--.

Line 44, "resin A" should read --resin (A)--.

COLUMN 10:

Line 26, "a" should be deleted.

COLUMN 11:

Line 14, "p1" should be deleted.

Line 56, "substrate" should read --substrates--.

COLUMN 12:

Line 54, "equipments" should read --equipment--.

COLUMN 14:

Line 4 (Example 2 continued), "510;" should be deleted.

UNITED STATES PATENT AND TRADEMARK OFFICE

CERTIFICATE OF CORRECTION

PATENT NO. : 4,887,097

DATED : December 12, 1989

INVENTOR(S) : Akiya, et al.

It is certified that error appears in the above-identified patent and that said Letters Patent is hereby corrected as shown below:

COLUMN 15:

Line 46, "an" should read --a--.

Line 52, "time" should read --times--.

COLUMN 16:

Line 32, "equipments," should read --equipment,--.

COLUMN 17:

Line 45 (Line 27 of Table 1),

"Linear transmittance: 72 % 70% 73%" should read
--Linear transmittance: 72% 70% 73%--

COLUMN 18:

Line 37, "or more" should be deleted.

Line 54, "05 times" should read --0.5 times--.

UNITED STATES PATENT AND TRADEMARK OFFICE

CERTIFICATE OF CORRECTION

PATENT NO. : 4,887,097

DATED : December 12, 1989

INVENTOR(S) : Akiya, et al.

It is certified that error appears in the above-identified patent and that said Letters Patent is hereby corrected as shown below:

COLUMN 20:

Line 43, "whereinthe" should read --wherein the--.

Signed and Sealed this

Sixth Day of August, 1991

Attest:

HARRY F. MANBECK, JR.

*Attesting Officer*

*Commissioner of Patents and Trademarks*